US011520499B1

(12) United States Patent
Cermak et al.

(10) Patent No.: US 11,520,499 B1
(45) Date of Patent: Dec. 6, 2022

(54) ON-DEMAND ACTIVATION OF MEMORY PATH DURING SLEEP OR ACTIVE MODES

(71) Applicant: Ambiq Micro, Inc., Austin, TX (US)

(72) Inventors: Daniel Martin Cermak, Austin, TX (US); Scott McLean Hanson, Morganville, NJ (US); Yousof Mortazavi, Austin, TX (US); Ramakanth Kondagunturi, Austin, TX (US)

(73) Assignee: Ambiq Micro, Inc., Austin, TX (US)

( * ) Notice: Subject to any disclaimer, the term of this patent is extended or adjusted under 35 U.S.C. 154(b) by 0 days.

(21) Appl. No.: 17/747,410

(22) Filed: May 18, 2022

(51) Int. Cl.
    *G06F 3/06* (2006.01)
(52) U.S. Cl.
    CPC .......... *G06F 3/0625* (2013.01); *G06F 3/0626* (2013.01); *G06F 3/0655* (2013.01); *G06F 3/0673* (2013.01)
(58) Field of Classification Search
    CPC .... G06F 3/0625; G06F 3/0626; G06F 3/0634; G06F 3/0635; G06F 3/0655; G06F 3/0659; G06F 3/0673; G06F 3/0679; G06F 3/0683; G06F 3/0688
    USPC .......................... 711/103, 154; 713/323, 324
    See application file for complete search history.

(56) References Cited

U.S. PATENT DOCUMENTS

| 2010/0128550 A1* | 5/2010 | Lovett | G11C 8/06 365/230.01 |
| 2015/0227186 A1* | 8/2015 | Bhatia | G11C 5/14 713/320 |
| 2019/0041959 A1* | 2/2019 | Pappu | G06F 13/42 |
| 2022/0004328 A1* | 1/2022 | Yardi | G06F 3/0625 |

* cited by examiner

Primary Examiner — Gary J Portka
(74) Attorney, Agent, or Firm — Nixon Peabody LLP

(57) ABSTRACT

A low-power system-on-chip includes an originating controller, a fabric, and a power controller. The originating controller is configured to initiate a memory transaction request including a source address. The fabric includes an arbiter configured to receive the memory transaction request and determine a first memory device associated with the memory transaction request. The power controller is configured to selectively change a first memory bank of the first memory device from a first power mode to a second power mode based at least in part on the source address. The fabric is configured to perform a memory operation by (a) receiving stored data from memory storage locations corresponding to the source address when the memory transaction request includes a read request, and (b) sending data included in the memory transaction request to the memory storage locations when the memory transaction request includes a program or a write request.

24 Claims, 5 Drawing Sheets

ON-DEMAND ACTIVATION OF MEMORY PATH DURING SLEEP OR ACTIVE MODES

FIELD OF THE INVENTION

The present invention relates generally to low-power microcontroller systems and power management of such systems, and, more specifically, to power reduction in low-power microcontroller systems through activation and deactivation of one or more data-access paths.

BACKGROUND OF THE INVENTION

In recent years, due to the growth of portable electronics, there has been a push to decrease the power used by microcontrollers, microprocessors, application processors, digital signal processors (DSPs), neural processing units (NPUs), and other circuits used in portable electronic appliances. With lower power requirements, effective electronics operation time can be extended, or alternatively, smaller batteries can be used. Commonly, the power consumption of a microcontroller and associated circuits may be reduced by using a lower supply voltage, or by reducing the amount of internal capacitance being charged and discharged during the operation of the circuits.

One method for reducing microcontroller power relies on hardware or software-based power mode switching. Power modes can be selected for microcontroller components or resources based on operating state, operating conditions, and/or sleep cycle characteristics to configure low power modes for selected microcontroller components at the time the processor enters a low power or sleep state. In some systems, a set of predefined low power configurations can be used, while more sophisticated systems can dynamically select low power configurations to maximize power savings while still meeting system latency requirements.

Currently, for components with memories, when a transaction request is sent from a processor to access a memory location within a specific memory instance, the component can consume a significant amount of power. This significant power consumption occurs even in dormant periods for the component. Accordingly, it is desirable to achieve finer granularity in controlling power consumption of the component in order to achieve power savings.

SUMMARY OF THE INVENTION

The term embodiment and like terms, e.g., implementation, configuration, aspect, example, and option, are intended to refer broadly to all of the subject matter of this disclosure and the claims below. Statements containing these terms should be understood not to limit the subject matter described herein or to limit the meaning or scope of the claims below. Embodiments of the present disclosure covered herein are defined by the claims below, not this summary. This summary is a high-level overview of various aspects of the disclosure and introduces some of the concepts that are further described in the Detailed Description section below. This summary is not intended to identify key or essential features of the claimed subject matter. This summary is also not intended to be used in isolation to determine the scope of the claimed subject matter. The subject matter should be understood by reference to appropriate portions of the entire specification of this disclosure, any or all drawings, and each claim.

According to one aspect of the present disclosure, a low-power system-on-chip is provided. The system-on-chip includes an originating controller, a fabric, and a power controller. The originating controller is configured to initiate a memory transaction request. The fabric is communicatively coupled to the originating controller. The fabric includes an arbiter configured to receive the memory transaction request and determine a first memory device associated with the memory transaction request. The memory transaction request includes a source address. The power controller is communicatively coupled to at least one of the originating controller or the fabric. The power controller is configured to selectively change a first memory bank of the first memory device from a first power mode to a second power mode based at least in part on the source address. The fabric is configured to perform a memory operation by (a) receiving stored data from memory storage locations corresponding to the source address when the memory transaction request includes a read request, and (b) sending data included in the memory transaction request to the memory storage locations when the memory transaction request includes a program request or a write request.

In an implementation, the first power mode is one of a retention mode or a standby mode and the second power mode is an active mode. In an implementation, the power controller is further configured to selectively change the first memory bank of the first memory device from the second power mode to the first power mode. In an implementation, the power controller selectively changes the first memory bank of the first memory device from the second power mode to the first power mode in response to a sleep signal generated by a counter, the originating controller, and/or the arbiter. In an implementation, the power controller is further configured to selectively change the first memory bank of the first memory device from the second power mode to a third power mode. The second power mode has a higher power draw than the third power mode, and the third mode has a higher power draw than the first power mode.

In an implementation, the first memory device includes a plurality of memory banks including the first memory bank and a second memory bank. The power controller is configured to maintain other memory banks, including the second memory bank, in the first power mode when selectively changing the first memory bank from the first power mode to the second power mode. In an implementation, the low-power system-on-chip further includes a second memory device. The power controller is configured to maintain the second memory device in the first power mode when selectively changing the first memory bank from the first power mode to the second power mode.

In an implementation, the power controller is configured to selectively change the first memory bank from the first power mode to the second power mode by changing power supplied to the first memory bank from a first voltage level to a second voltage level. The second voltage level is greater than the first voltage level. In an implementation, the power controller is further configured to change the power supplied to the first memory bank from the second voltage level to the first voltage level after the fabric performs the memory operation. In an implementation, the first memory device includes a plurality of memory banks including the first memory bank. The power controller is further configured to selectively change each memory bank in the plurality of memory banks, from the first power mode to the second power mode. In an implementation, the fabric further includes one or more of multiplexers, buffers, switches, and crossbars. In an implementation, the fabric is a network-on-chip (NoC) having at least a first logic domain and a second logic domain. The first logic domain can switch between an active mode and a standby mode, and the second logic domain can switch between an on state and an off state. In an implementation, the arbiter is a programmable logic. In an implementation, the originating controller includes one or more of a microcontroller unit, a central processing unit, a graphics processing unit, a neural processing unit, a direct memory access controller, a serial communications controller, and an analog-to-digital converter.

In an implementation, the serial communications controller includes a universal serial bus (USB) controller, inter-integrated circuit (I2C) controller, and/or serial peripheral interface (SPI) controller. In an implementation, the first memory device is a random access memory (RAM), a tightly-coupled memory (TCM), nonvolatile memory (NVM), a cache, an external memory, a register, a register file, a peripheral device. In an implementation, the first memory bank includes memory storage locations corresponding to the source address such that the fabric performs the memory operation on the first memory bank. In an implementation, the first memory device includes a plurality of memory banks including the first memory bank and a second memory bank. The second memory bank is configured in the second power mode, and the second memory bank includes the memory storage locations corresponding to the source address such that the fabric performs the memory operation on the second memory bank. The power controller selectively changes the first memory bank from the first power mode to the second power mode in response to the fabric performing the memory operation on the second memory bank.

According to one aspect of the present disclosure, a method for operating a memory device in a low-power system-on-chip is provided. An arbiter receives a memory transaction request generated by an originating controller. The memory transaction request includes a source address. The arbiter determines a first memory device associated with the memory transaction request. The arbiter requests that a power controller selectively change a first memory bank of the first memory device from a first power mode to a second power mode based at least in part on the source address. A fabric performs a memory operation by: (a) receiving stored data from the memory storage locations corresponding to the source address when the memory transaction request includes a read request, and (b) sending data included in the memory transaction request to the memory storage locations when the memory transaction request includes a program request or a write request.

In an implementation, the first power mode is one of a retention mode or a standby mode and the second power mode is an active mode. In an implementation, the arbiter requests that the power controller selectively change the first memory bank of the first memory device from the second power mode to the first power mode. In an implementation, the originating controller includes one or more of a microcontroller unit, a central processing unit, a graphics processing unit, a direct memory access controller, an analog-to-digital converter, and a serial communications controller. In an implementation, the first memory bank includes memory storage locations corresponding to the source address. In an implementation, the first memory device includes a plurality of memory banks including the first memory bank and a second memory bank. The second memory bank is in the second power mode. The second memory bank includes the memory storage locations corresponding to the source address such that the fabric performing the memory operation on the second memory bank triggers the power controller selectively changing the first memory bank from the first power mode to the second power mode.

Additional aspects of the disclosure will be apparent to those of ordinary skill in the art in view of the detailed description of various embodiments, which is made with reference to the drawings, a brief description of which is provided below.

Figure 1:
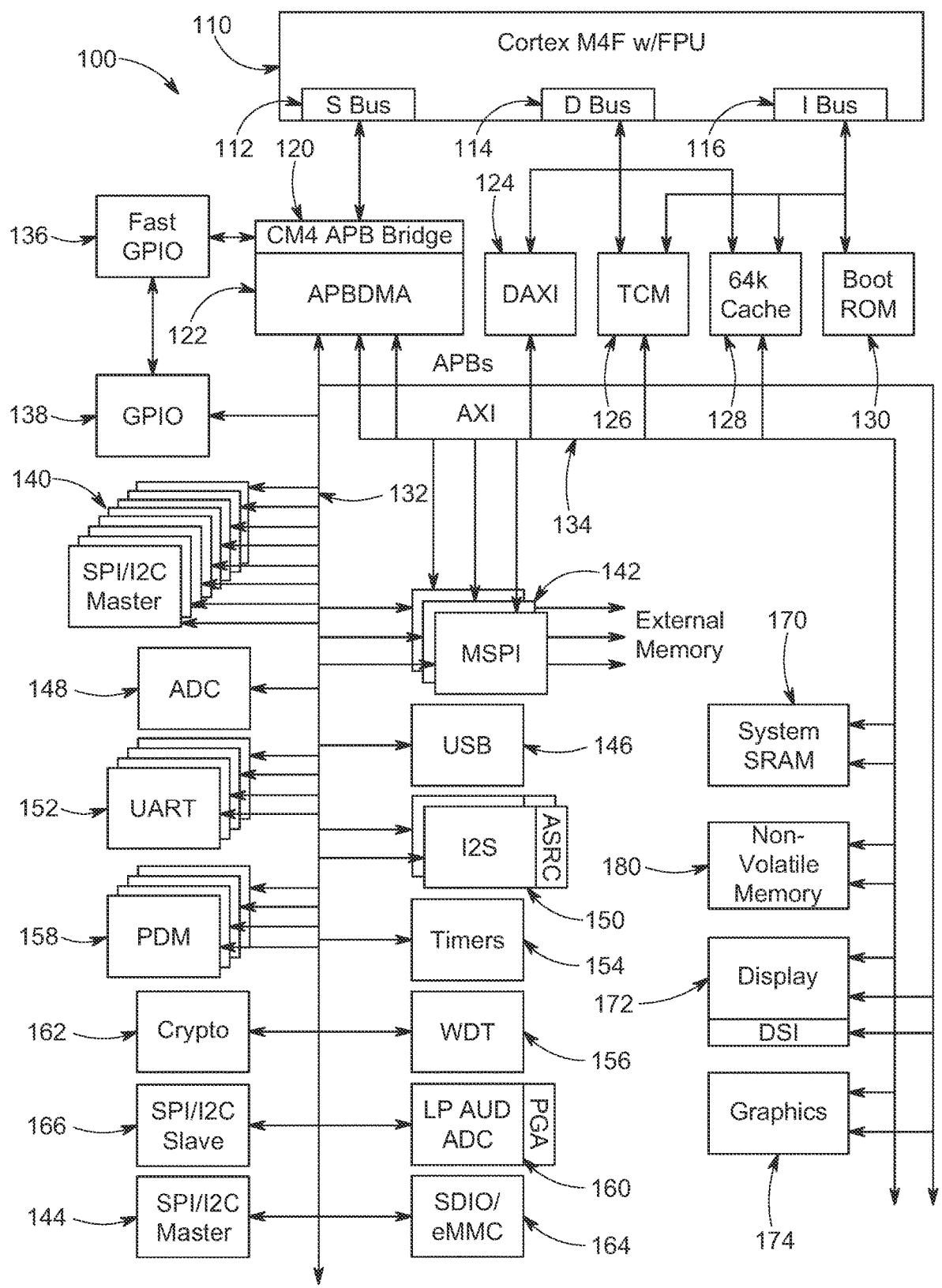
FIG. 1 is a block diagram of an example microcontroller system, according to some implementations of the present disclosure.

While the invention is susceptible to various modifications and alternative forms, specific embodiments have been shown by way of example in the drawings and will be described in detail herein. It should be understood, however, that the invention is not intended to be limited to the particular forms disclosed. Rather, the invention is to cover all modifications, equivalents, and alternatives falling within the spirit and scope of the invention as defined by the appended claims.

DETAILED DESCRIPTION

In computing systems, when a transaction request is sent from an agent (e.g., a central processing unit (CPU), a graphics processing unit (GPU), a neural processing unit (NPU), a digital signal processor (DSP), direct access media (DMA) controller, etc.) to access a specific memory device via a fabric/interconnect device, all banks (or units or macros) within the specific memory device are activated and stay turned on. Having all memory banks turned on when only a subset of the memory banks is used, wastes energy on the unused banks. Unused memory banks consume excess power, which can lead to a faster drain of a battery source or can lead to excess heat generation in the memory device. Accordingly, embodiments of the present disclosure provide a system and method for reducing excess power consumption by activating memory devices, or memory banks within one or more memory devices, as needed. The data path that allows information flow between the agent and the activated memory is a memory path, and more generally, a data-access path. For example, power switches can be used to turn off certain memory banks, or memory banks can be placed in standby or low power mode by reducing voltage or current supplied to the memory banks.

Elements and limitations that are disclosed, for example, in the Abstract, Summary, and Detailed Description sections, but not explicitly set forth in the claims, should not be incorporated into the claims, singly, or collectively, by implication, inference, or otherwise. For purposes of the present detailed description, unless specifically disclaimed, the singular includes the plural and vice versa. The word "including" means "including without limitation." Moreover, words of approximation, such as "about," "almost," "substantially," "approximately," and the like, can be used herein to mean "at," "near," or "nearly at," or "within 3-5% of," or "within acceptable manufacturing tolerances," or any logical combination thereof, for example.

Described herein are systems, methods, and apparatuses that seek to reduce power consumption of memory components associated with a microcontroller system. In one embodiment, a power source is provided that is configured to output power to the microcontroller system at multiple levels. For example, the power source can provide power at a first power level and a second power level, with the first power level being greater than the second power level. The memory components associated with the microcontroller system can change between the first power level and the second power level depending on operational signals generated by an agent. In some implementations, switches are provided in the microcontroller system to toggle or change between the different power levels. The discussion of FIGS. 1 and 2 provides an overview of a microcontroller system that can take advantage of the power reduction method described herein.

Figure 2:
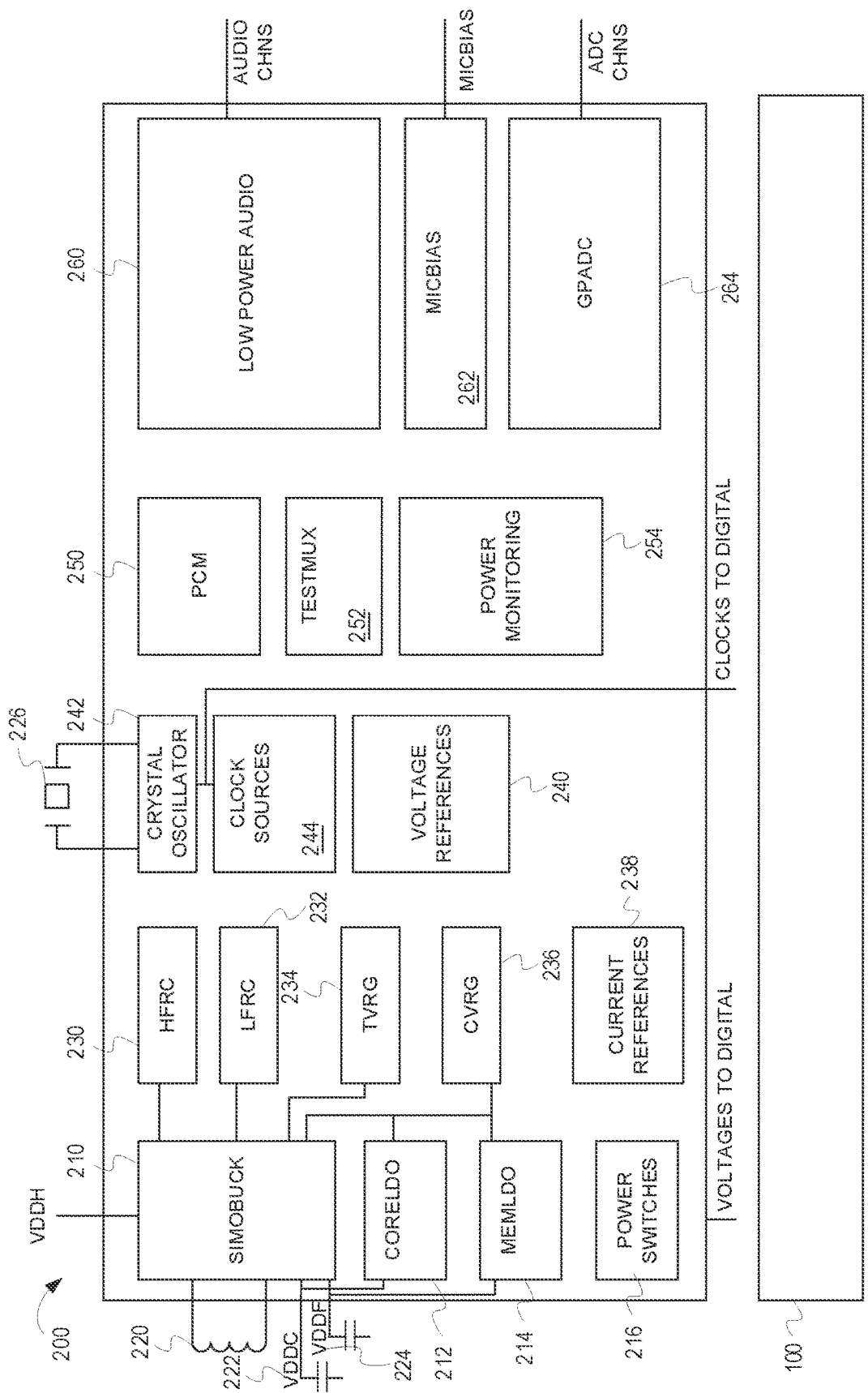
FIG. 2 is a block diagram of an example analog module that supplies power, external signals, and clock signals to the microcontroller system in FIG. 1, according to some implementations of the present disclosure.

Referring to FIG. 1, a block diagram of an example microcontroller system 100 is provided, according to some implementations of the present disclosure. The microcontroller system 100 can be a system-on-chip (SoC). The microcontroller system 100 includes a central processing unit (CPU) 110. The CPU 110 in this example is Cortex M4F (CM4) with a floating point unit. The CPU 110 includes a system bus interface 112, a data bus interface 114, and an instruction bus interface 116. It is to be understood, that other types of general CPUs, or other processors such as DSPs or NPUs may incorporate the principles described herein.

The system bus interface 112 is coupled to a Cortex CM4 advanced peripheral bus (APB) bridge 120 that is coupled to an advanced peripheral bus (APB) direct memory access (DMA) module 122. The microcontroller system 100 includes a Data Advanced eXtensible Interface (DAXI) 124, a tightly-coupled memory (TCM) 126, a cache 128, and a boot ROM 130. The data bus interface 114 allows access to the DAXI 124, the TCM 126, the cache 128, and the boot read only memory (ROM) 130. The instruction bus interface 116 allows access to the TCM 126, the cache 128, and the boot ROM 130. In this example, the DAXI interface 124 provides write buffering and caching functionality for the microcontroller system 100. The DAXI interface 124 improves performance when accessing peripherals like the static random access memory (SRAM) and the multi-bit serial peripheral interfaces (MSPIs).

An APB 132 and an Advanced eXtensible Interface (AXI) bus 134 are provided for communication between components on the microcontroller system 100. The APB 132 is a low speed and low overhead interface that is used for communicating with peripherals and registers that do not require high performance and do not change often (e.g., when a controller wants to set configuration bits for a serial interface). The AXI bus 134 is an ARM standard bus protocol that allows high speed communications between multiple masters and multiple busses. This is useful for peripherals that exchange large amounts of data (e.g., a controller that talks to an analog to digital converter (ADC) and needs to transfer ADC readings to a microcontroller or a GPU that talks to a memory and needs to transfer a large amount of graphics data to/from memories).

A fast general purpose input/output (GPIO) module 136 is coupled to the APB bridge 120. A GPIO module 138 is coupled to the fast GPIO module 136. The APB bus 132 is coupled to the GPIO module 138. The APB bus 132 is coupled to a series of serial peripheral interface/inter-integrated circuit (SPI/I2C) interfaces 140 and a series of MSPIs 142. The MSPIs 142 are also coupled to the AXI bus 134 and provide access to external memory devices.

The APB bus 132 also is coupled to a SPI/I2C interface 144, a universal serial bus (USB) interface 146, an analog to digital converter (ADC) 148, an Integrated Inter-IC Sound Bus (I2S) interface 150, a set of Universal Asynchronous Receiver/Transmitters (UARTs) 152, a timers module 154, a watch dog timer circuit 156, a series of pulse density modulation (PDM) interfaces 158, a low power audio ADC 160, a cryptography module 162, a Secure Digital Input Output/Embedded Multi-Media Card (SDIO/eMMC) interface 164, and a SPI/I2C slave interface module 166. The PDM interfaces 158 may be connected to external digital microphones. The low power audio ADC 160 may be connected to an external analog microphone through internal programmable gain amplifiers (PGA).

A system static random access memory (SRAM) 170, which is 1MB in this example, is accessible through the AXI bus 134. The system SRAM 170 is a shared SRAM. The microcontroller system 100 includes a display interface 172 and a graphics interface 174 that are coupled to the APB bus 132 and the AXI bus 134.

Components of the disclosed microcontroller system 100 are further described by U.S. Provisional Serial No. 62/557,534, titled "Very Low Power Microcontroller System," filed Sep. 12, 2017; U.S. application Ser. No. 15/933,153, filed Mar. 22, 2018 titled "Very Low Power Microcontroller System," (Now U.S. Pat. No. 10,754,414), U.S. Provisional Serial No. 62/066,218, titled "Method and Apparatus for Use in Low Power Integrated Circuit," filed Oct. 20, 2014; U.S. application Ser. No. 14/855,195, titled "Peripheral Clock Management," (Now U.S. Pat. No. 9,703,313), filed Sep. 15, 2015; U.S. application Ser. No. 15/516,883, titled "Adaptive Voltage Converter," (Now U.S. Pat. No. 10,338,632), filed Sep. 15, 2015; U.S. application Ser. No. 14/918,406, titled "Low Power Asynchronous Counters in a Synchronous System," (Now U.S. Pat. No. 9,772,648), filed Oct. 20, 2015; U.S. application Ser. No. 14/918,397, titled "Low Power Autonomous Peripheral Management," (Now U.S. Pat. No. 9,880,583), filed Oct. 20, 2015; U.S. application Ser. No. 14/879,863, titled "Low Power Automatic Calibration Method for High Frequency Oscillators," (Now U.S. Pat. No. 9,939,839), filed Oct. 9, 2015; U.S. application Ser. No. 14/918,437, titled "Method and Apparatus for Monitoring Energy Consumption," (Now U.S. Pat. No. 10,578,656), filed Oct. 20, 2015; U.S. application Ser. No. 17/081,378, titled "Improved Voice Activity Detection Using Zero Crossing Detection," filed Oct. 27, 2020, U.S. application Ser. No. 17/081,640, titled "Low Complexity Voice Activity Detection Algorithm," filed Oct. 27, 2020, all of which are hereby incorporated by reference.

While the discussion of FIG. 1 describes the microcontroller system 100, the discussion of FIG. 2 describes an analog module 200 that supplies power, external signals, and clock signals to the microcontroller system 100. The analog module 200 supplies power to different components of the microprocessor system 100 as well as providing clocking signals to the microcontroller system 100. The analog module 200 includes a Single Inductor Multiple Output (SIMO) buck converter 210, a core low drop-out (LDO) voltage regulator 212, and a memory LDO voltage regulator 214.

The LDO voltage regulator 212 supplies power to processor cores of the microcontroller system 100, while the memory LDO voltage regulator 214 supplies power to volatile memory devices of the microcontroller system 100 such as the system SRAM 170. A switch module 216 represents switches that allow connection of power to the different components of the microcontroller system 100.

The SIMO buck converter 210 is coupled to an external inductor 220. The module 200 is coupled to a capacitor for a core voltage (VDDC) 222 and a capacitor for the memory voltage (VDDF) 224. The VDDC capacitor 222 smooths the voltage output of the core LDO voltage regulator 212 and the SIMO buck converter 210. The VDDF capacitor 224 smooths the voltage output of the memory LDO voltage regulator 214 and the SIMO buck converter 210. The analog module 200 is also coupled to an external crystal 226 to provide clock signals.

The SIMO buck converter 210 is coupled to one or more reference circuits, for example, a high frequency resistor-capacitor (HFRC) oscillator 230, a low frequency resistor-capacitor (LFRC) oscillator 232, and a temperature-sensitive voltage reference generator (TVRG) circuit 234. A calibrated voltage voltage regulator (CVRG) circuit 236 is coupled to the SIMO buck converter 210, the core LDO voltage regulator 212, and the memory LDO voltage regulator 214. Thus, both load compensation and temperature compensation are performed on the voltage sources. A set of current reference circuits 238 is provided as well as a set of voltage reference circuits 240.

In this example, the LDO voltage regulators 212 and 214 are used to power up the microcontroller system 100 and provide voltage at different levels to different components. The more efficient SIMO buck converter 210 is used to power different components on the microcontroller system 100 on demand during normal operation.

A crystal oscillator circuit 242 is coupled to the external crystal 226. The crystal oscillator circuit 242 provides a drive signal to a set of clock sources 244. The clock sources 244 include multiple clocks providing different frequency signals to the components on the microcontroller system 100. In this example, three clocks at different frequencies may be selectively coupled to drive different components on the microcontroller system 100.

The analog module 200 also includes a process control monitoring (PCM) module 250 and a test multiplexer 252. Both the PCM module 250 and the test multiplexer 252 allow testing and trimming of the microcontroller system 100 prior to shipment. The PCM module 250 includes test structure that allow programming of the compensation voltage regulator 236. The PCM module 250 contains a set of circuit devices (e.g., transistor devices, resistor devices, etc.) that are measured to determine how to trim a part. For example, these measurements can be used to determine how to trim various blocks (e.g., how to trim or adjust a CVRG, a TVRG, etc). The test multiplexer 252 allows trimming of different components on the microcontroller system 100. The analog module 200 includes a power monitoring module 254 that allows power levels to different components on the microcontroller system 100 to be monitored. The power monitoring module 254 in this example includes multiple state machines that determine when power is required by different components of the microprocessor system 100. The power monitoring module 254 works in conjunction with the power switch module 216 to supply appropriate power when needed to the components of the microprocessor system 100. The analog module 200 includes a low power audio module 260 for audio channels, a microphone bias module 262 for biasing external microphones, and a general purpose analog to digital converter 264.

The SIMO buck converter 210 supplies DC voltage at different levels to components and devices of the microcontroller system 100 in FIG. 1 and the analog module 200 in FIG. 2. As explained above, the SIMO buck converter 210 is coupled via the power switch module 216 to provide power and thus enable different components and devices on the microcontroller system 100 and the analog module 200. The SIMO buck converter 210 serves as an efficient power supply for the components and devices on the microcontroller system 100 and the analog module 200.

Figure 3:
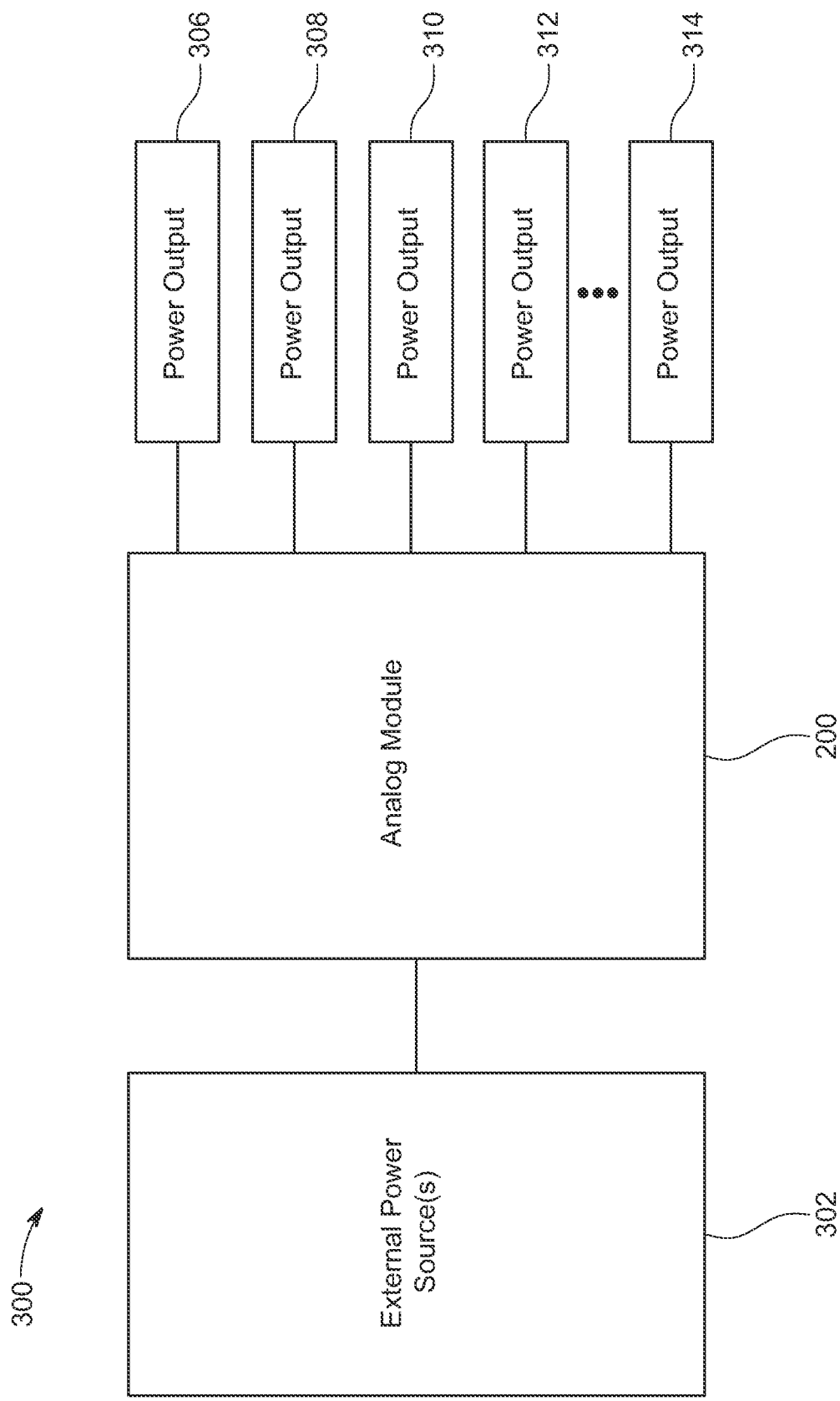
FIG. 3 is a block diagram illustrating power generation for a microcontroller system, according to some implementations of the present disclosure.

While the discussion of FIGS. 1 and 2 provides detail regarding the microcontroller system 100 and the analog module 200, FIG. 3 provides a simplified concept of the role of the analog module 200. The analog module 200 connects to one or more external power sources 302, and provides one or more power outputs (e.g., power outputs 306, 308, 310, 312, 314). FIG. 3 focuses more on the power provision role of the analog module 200 and does not depict clock signal outputs or other outputs as shown in FIG. 2. Each of the power outputs 306, 308, 310, 312, 314 can include multiple voltage levels. For example, power output 306 can provide a first voltage level (e.g., 1.8 V) during a first operation, and can switch to a second voltage level (e.g., 1.2 V) during a second operation. The analog module 200 includes switches (e.g., the power switches 216 (FIG. 2)) to facilitate each of the power outputs switching voltage levels. Although two voltage levels are provided here as an example, each of the power outputs can switch between more than two voltage levels (e.g., three voltage levels, four voltage levels, five voltage levels, etc.).

In some implementations, the power outputs provide power to different types of components. For example, the power output 306 can provide power to a cache and/or a data transfer controller (DTC) associated with the CPU 110. The power output 306 can change power supplied to the cache and/or the DTC depending on whether the cache and/or the DTC is operating in an active mode or in a low power mode. The power output 308 can provide power to one or more RAM banks (e.g., one or more RAM banks within the system SRAM 170). Similarly, the power output 308 can adjust power provided to the one or more RAM banks. The power output 310 can provide power to one or more processing units (e.g., the CPU 110, a GPU, an NPU, a DSP, etc.). The power output 312 can provide power to one or more peripheral devices (e.g., a USB device, a microphone, a speaker, etc.). The power output 314 can provide power to one or more wireless transmitters, receivers, or transceivers. The power output configurations described here only present one non-limiting example of how to organize generated power.

In some implementations, the external power source 302 includes one or more external regulators and/or batteries. The external power source 302 can provide different voltage output levels such as 0.9 V, 1.2 V, 1.8 V, 3.3 V, etc. In some implementations, multiple voltage levels are provided by the external power source 302. The analog module 200 uses the voltage levels from the external power source 302 to generate the power outputs in FIG. 3. Voltage levels provided by the external power source 302 can be different from the voltage levels at the power outputs 306, 308, 310, 312, and 314. Components of the analog module 200 such as the buck converter 210 or the LDOs can step up, step down, or pass the voltage levels provided by the external power source 302.

Figure 4:
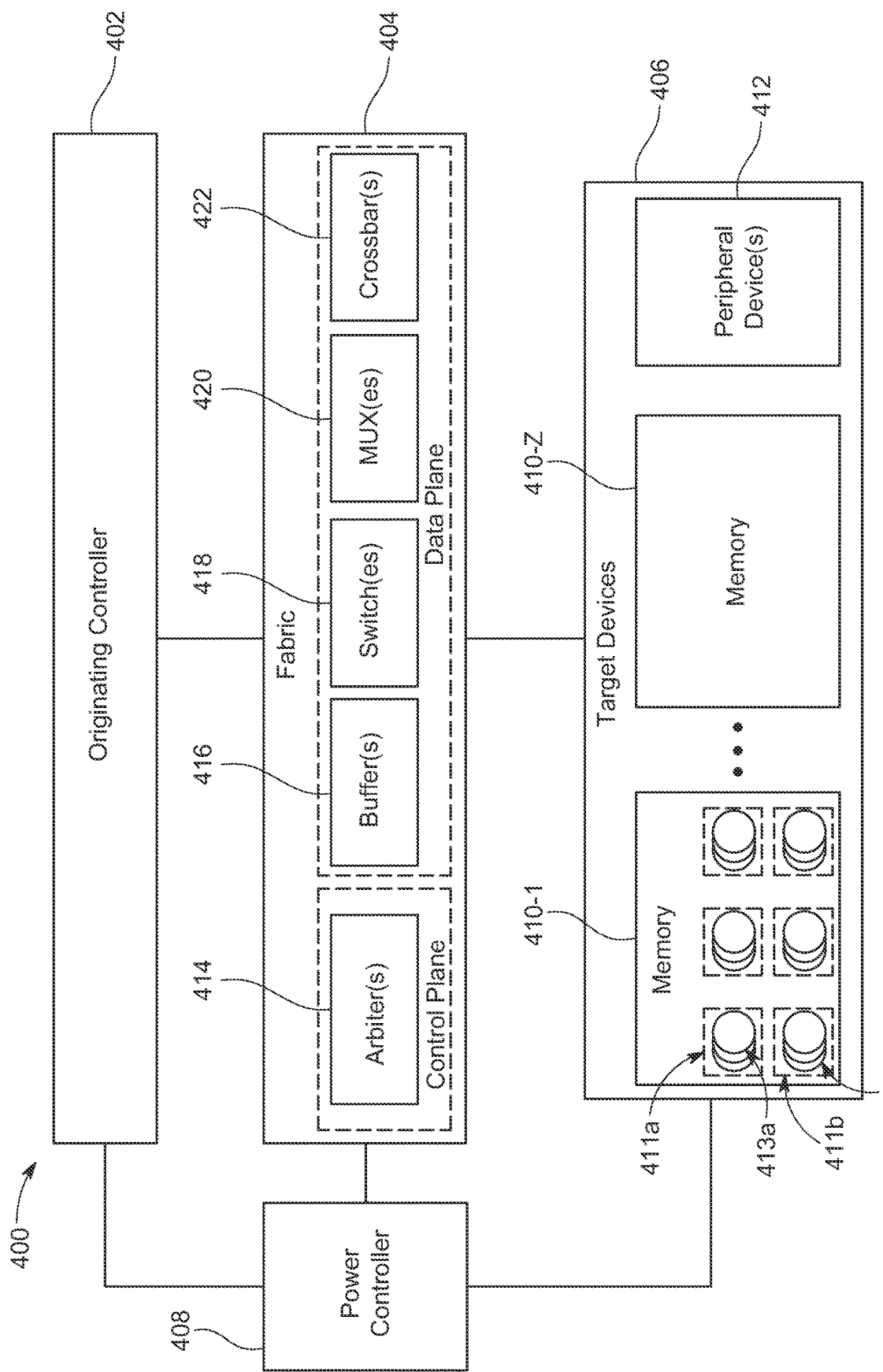
FIG. 4 is a block diagram illustrating components of a microcontroller system for accessing one or more target devices, according to some implementations of the present disclosure.

FIG. 4 is a block diagram illustrating a system 400 for accessing one or more target devices, according to some implementations of the present disclosure. In some implementations, the system 400 is part of the microcontroller system 100 of FIG. 1. The microcontroller system 100 is preferably a low-power microcontroller system. In some implementations, the microcontroller system 100 operates in multiple power states. In an example, the microcontroller system 100 has an active microcontroller unit (MCU) state and a sleep MCU state. In the active MCU state, the core of the microcontroller system 100 is on. In the sleep MCU state, the core of the microcontroller system 100 is powered off. With the microcontroller system 100 operating in sleep mode, different agents (e.g., CPUs, GPUs, DMA controllers, etc.) can initiate transaction requests to access particular memory devices for read, write, or program operations.

In some implementations, the core of the microcontroller system 100 is the CPU 110. In some implementations, the CPU 110 is the Cortex M4F with a floating point unit (FPU) which includes a collection of blocks. For example, the Cortex M4F with a FPU can include the core (i.e., the actual processor), one or more retention registers, one or more wake interrupt controllers (WICs), one or more power management units (PMUs), one or more debug blocks, etc.

In some implementations, components of the microcontroller system 100 operates in four power states. The four power states for the microcontroller system 100 can include an active mode, a sleep mode, a deep sleep mode and an off mode. In the sleep mode, all components of the microcontroller system 100 are still powered, but clocks (i.e., clock signals) are gated. In deep sleep mode, the core of the microcontroller system 100 is powered down, but the retention registers, WIC, etc., stay powered up to allow the core (i.e., the actual processor) to resume operation after powering back up to active mode. In off mode, the core and the retention registers are powered down. Optionally, the other blocks in the microcontroller system 100 are powered down as well.

In general, each of the different agents is referred to in the system 400 as an originating controller 402, and the particular memory devices are referred to as target devices 406. The system 400 includes the originating controller 402, a fabric 404, one or more target devices 406, and a power controller 408. The originating controller 402 initiates transaction requests to access particular target devices 406. Examples of the originating controller 402 include a microcontroller unit, a CPU (e.g., the CPU 110), an NPU, a GPU, a DMA controller (e.g., the APB DMA module 122), a data converter (e.g., an ADC), a serial communications controller, etc. The serial communications controller can include a USB controller, an I2C controller, an SPI controller, etc. Examples of target devices 406 include a RAM (e.g., the system SRAM 170 or shared SRAM), TCM 126, nonvolatile memory (NVM) 180, the cache 128, an external memory, a register, a register file, a peripheral device (e.g., a USB peripheral device). FIG. 4 merely provides an example arrangement of components. In some implementations, the power controller 408 is not communicatively connected to both the originating controller 402 and the fabric 404. The power controller 408 can be communicatively connected to only one or both of the originating controller 402 or the fabric 404.

The transaction requests initiated by the originating controller 402 are queued up for evaluation. In some implementations, the fabric 404 includes a control plane and a data plane. The control plane refers to the functions and processes that determine which path to use to send the packets or frames. In some implementations, the control plane is responsible for enabling the data plane functions. The data plane refers to the functions and processes that forward packets or frames from one interface to another based on the control plane.

An arbiter 414 is provided in the control plane to evaluate the queued transaction requests. The arbiter 414 functions as a fabric control logic for the fabric 404 to facilitate activities by the fabric 404 in meeting transaction requests. Although the arbiter 414 is shown as being part of the fabric 404, in some implementations, the arbiter 414 can be part of the originating controller 402. The arbiter 414 evaluates the transaction request by decoding a source address contained in the transaction request. In some implementations, the source address is an address of a memory location within the target device 406. Based on the source address, the arbiter 414 requests the power controller 408 to activate a specific path to the target device 406 requested by the originating controller 402.

The fabric 404 further includes one or more buffers 416, switches 418, multiplexers (MUXes) 420, and crossbars 422. Each of these components of the fabric 404 are within the data plane of the fabric 404. The buffers 416 can facilitate queuing data (e.g., queuing transaction requests and/or other data propagating through the fabric 404). The buffers 416 can prevent information loss when the fabric 404 is still processing a previous request and is not ready to process the queued data. The switches 418 and MUXes 420 facilitate routing data between the originating controller 402 and the target devices 406. The crossbar 422 is merely provided as an example wiring.

Once the power controller 408 activates the specific path to the target device 406, the originating controller 402 is granted access to the target device 406. In some implementations, the target device 406 includes at least one memory (e.g., a first memory 410-1, . . . , a Z-th memory 410-Z). Z is an integer greater than or equal to 1. The originating controller 402 is granted access to the at least one memory using the specific path that was activated by the power controller 408.

In some implementations, the first memory 410-1 includes at least one memory bank (e.g., a first memory bank 411a with memory storage locations 413a and a second memory bank 411b with memory storage locations 413b). The power controller 408 activates the specific path to at least one memory bank of the first memory 410-1. For example, the specific path activated can allow the originating controller 402 to have access to only the first memory bank 411a. The originating controller 402 can then use the specific path to the first memory bank 411a to perform one or more memory operations at the first memory bank 411a.

In some implementations, the specific path stays active until the one or more memory operations are completed. In some implementations, a counter can be used to provide a time buffer to control timing between completion of the memory operations and when the specific path is deactivated. The counter can be provided in the control plane of the fabric 404, in one or more of the target devices 406, or in the originating controller 402, etc. The counter can provide a sleep signal to the power controller 408 for deactivating the specific path based on the time to complete the memory operation. The sleep signal can include an identifier for the entire memory to be deactivated, an identifier for the memory bank to be deactivated, or both. In some implementations, the time buffer is 10 microseconds, 10 milliseconds, 0.5 seconds, 1 second, 10 seconds, 30 seconds, 1 minute, 4 minutes, 5 minutes, 10 minutes, etc. In some implementations, deactivating the specific path includes placing the first memory 410-1 in standby mode (i.e., a low power state) for a first duration and then eventually placing the first memory 410-1 in retention mode (i.e., a lower power state). Further discussion and distinction between power modes is provided below in connection to FIG. 5.

In some implementations, deactivating the specific path includes placing the first memory bank 411a in standby mode for the first duration and then eventually placing the first memory bank 411a in retention mode. The transition from standby mode to retention mode can occur due to inactivity. For example, the counter can reset when there are multiple memory operations being performed, spaced apart in time, as long as the spacing between the memory operations does not exceed the time buffer allotted by the counter. That is, the counter can reset each time a memory operation is being performed, and the counter can count up (or count down, depending on implementation) each time there is an inactivity. When the counter counts for a duration that is equal to or exceeds the time buffer, then the counter can generate the sleep signal for transitioning from standby mode to retention mode. Although a counter is discussed herein, any type of counter can be provided, for example, the counter can be a hysteresis counter.

In some implementations, when a specific memory bank (e.g., the first memory bank 411a) is activated, other memory banks (e.g., the second memory bank 411b) remain in the retention mode. Any one of the other memory banks is only activated from the retention mode to the active mode when a memory operation is to be performed at respective memory locations within the memory bank. Thus, energy consumed is minimized as only high energy is required by the activated memory bank and lower energy is consumed by memory banks in the retention mode.

In some implementations, the target device 406 includes a peripheral device 412. The peripheral device 412 can be a USB peripheral device (e.g., a USB thumb drive, a USB keyboard, a USB mouse, a USB dongle, USB keypad, etc.). In an example, the USB peripheral device enters a low power state due to inactivity. A USB controller (an example of the originating controller 402) can issue a command that causes the USB peripheral device to receive data or send data. For example, the USB peripheral device is a USB keyboard that is in a low power state. The USB keyboard includes a register that tracks whether the USB keyboard is in a low power mode or a normal operating mode. The register can be a 1-bit register that holds the current power mode of the USB keyboard. When in the low power mode, the 1-bit register can hold a value of 0, and when in the normal operating mode, the 1-bit register can hold a value of 1. The USB controller can issue a command to write a value of 1 to the 1-bit register to wake the USB keyboard. The arbiter 414 signal the power controller 408 to wake the USB keyboard by directing a writing of the value 1 to the 1-bit register. Once the value 1 is written, then the USB keyboard transitions to a normal operating mode. As discussed above, a counter can be used to transition the USB keyboard back to the low power mode.

The fabric 404 can be an intelligent fabric with rerouting capabilities. While decision-making on an optimal path to activate for power usage efficiency can be executed by software through a configuration based on priority, size of operation, etc., performing memory operations on the activated path can be based on handshakes among hardware. As such, when a particular path fails, the corresponding hardware will default and reroute the transaction request from the originating controller 402.

Path, as used herein, can depend on the specific implementation of the fabric 404. The intelligent fabric with rerouting capabilities in the previous example can be a network-on-chip (NoC) type interconnect. An NoC type interconnect includes router nodes, source nodes, and destination endpoints. Each point to point connection in the interconnect can be one of: (i) a source node to a router node, (ii) a router node to another router node, or (iii) a router node to a destination endpoint. A router resides at each router node, and the router can make a decision on how to route a transaction. For example, a specific router node can have N different paths to take to get a first transaction from the specific router node to a destination endpoint. Depending on the configuration of the interconnect defined at a given time, and also depending on the power state of the device at the destination endpoint, interconnect, etc., the router at the specific router node can select any one of paths 1, 2, . . . N to route the transaction. This selection can be made to optimize for one or more of power, latency, security, etc.

In some implementations, the arbiter 414 is a programmable logic in the originating controller 402 that is associated with the logic needed to send a control signal to the power controller 408. The programmable logic (i.e., the arbiter 414) will place the transaction request in a queue until the control signal is sent to the power controller 408. The programmable logic will then allow the specific transaction identified in the transaction request to be processed once the path to the target device 406 is activated. In some implementations, where the target device 406 includes one or more memory devices, each portion of a requested memory path can be activated on-demand based on availability, in order to complete the transaction. A decision to proceed along and activate a subsequent portion of the memory path is addressed after reaching a node in the requested memory path.

As discussed above, a path is a point to point connection between a source node (i.e., an originator of a transaction), a routing node (i.e., a router, a mux, etc.) and a destination endpoint (i.e., a target of the transaction). Each of the source node, the routing node, and the destination endpoint are nodes in the path. There may be Npaths to route the transaction from the source node to the destination endpoint. Certain paths can operate in a different power domain than other paths. As such, routing decisions can be made to take a path already powered-up or to power-up a path not yet powered. In some implementations, latency requirements are used to determine whether to power-up a path that is not yet powered if the path will provide the fastest routing for completing the transaction.

In some implementations, the fabric 404 is a network-on-chip (NoC) configured to adaptively connect multiple sources (e.g., the originating controller 402) and destinations (e.g., the target devices 406) based on the destination source address and lowest latency of point-to-point connection paths. The fabric 404 has a controller (e.g., the arbiter 414) programmed with a decision-tree-based routing table such that a determined path can be dynamically changed to optimize power efficiency. The fabric 404 can have different power domains independent of the target devices 406. The fabric 404 can operate in active, idle, and powered-off states. During the idle state, a minimum amount of logic is kept turned on to accept request from the originating controller 402 and associated with the logic needed to send a control signal to the power controller 408. In some implementations, the fabric 404 includes a first logic domain that is kept turned on to accept requests and a second logic domain that processes requests. The first logic domain and the second logic domain can be in different power domains such that the first logic domain can switch between an active mode and a standby mode. The second logic domain on the other hand can be turned off and only turned on as needed, for example, in response to the first logic domain receiving a request.

Although the fabric 404 is discussed as having a single active state, in some implementations, the fabric 404 can have multiple active states alongside the idle and powered-off states. For example, the different active states can include an ultra-low power active state, a low power active state, high performance active state, etc. Each of the different active states can run at different power levels. For example, the high performance active state can run at 3.3V, the low power active state can run at 1.8V, and the ultra-low power active state can run at 0.9V.

In some implementations, individual memory banks (e.g., the first memory bank 411a) as well as individual subsets of memory banks (e.g., a group of memory locations within the first memory bank 411a) in a specific memory device have independent power control and can be run at different voltages depending on the operation. Individual power switches to these memory banks can be located at the periphery of the specific memory device. The individual power switches can be controlled by power MUXes, which can be controlled by the power controller 408 to select any one of the different voltages. Further discussion of different voltages and power modes is provided below in connection with the example of FIG. 5.

Figure 5:
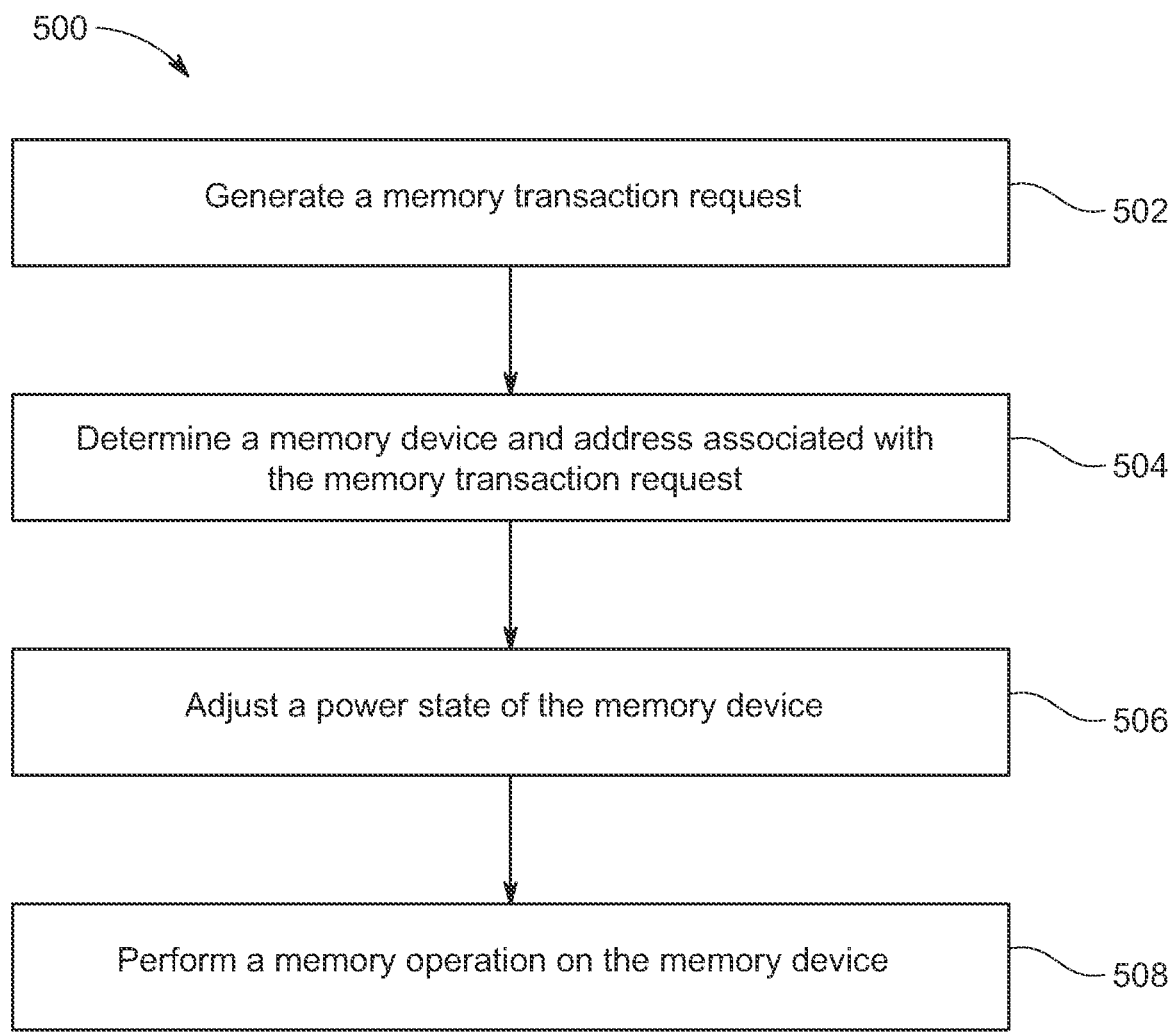
FIG. 5 is a flowchart illustrating example operations of accessing a memory device, according to some implementations of the present disclosure.

FIG. 4 provides a general information flow for the system 400, and FIG. 5 here is used to illustrate a specific example of using the system 400 in a memory operation. FIG. 5 is a flowchart illustrating example operations 500 of accessing a memory device (e.g., the memory device 410-1), according to some implementations of the present disclosure. The operations 500 will be described using the system 400 of FIG. 4. At step 502, a memory transaction request is generated. A memory transaction request is the same as or similar to a transaction request discussed above in connection with FIG. 4. The originating controller 402 initiates or generates the memory transaction request. The memory transaction request can identify a transaction for a program operation, a write operation, or a read operation to be performed on a memory device. The transaction for a program operation is a transaction directed at an NVM for performing sequences that will change content of a memory location within the NVM. The transaction for a write operation is similar to the transaction for the program operation, but is directed at RAM or other simpler memory structures where a memory location is targeted and written to. The transaction for a read operation results in returning contents of a memory location. The nature of the read can be memory dependent, that is, the read can be a destructive read, in the case of a dynamic RAM (DRAM), or can be a nondestructive read, in the case of an SRAM.

At step 504, a memory device and address associated with the memory transaction request is determined. The originating controller 402 can provide the memory transaction request to the fabric 404. The arbiter 414 can determine a memory device and a source address associated with the memory transaction request. In an example, the memory transaction request can include a memory device attribute that identifies the first memory device 410-1. The memory transaction request can include a source address attribute that identifies an address for the memory storage locations 413a. The memory transaction request in this example can merely state that a memory operation (e.g., read, write, or program operation) be performed on the memory storage locations 413a of the first memory device 410-1. In some implementations, for a write or program operation, the memory transaction request includes an identifier of a source register that stores data written (or programmed) to the memory storage locations 413a.

At step 506, a power state of the memory device at step 504 is adjusted. The arbiter 414 can trigger the power controller 408 to selectively change the first memory bank 411a of the first memory device 410-1 from a first power mode to a second power mode. Although the first memory device 410-1 is arranged in memory banks, in some implementations, there is only one memory bank, and selectively changing the first memory bank 411a from the first power mode to the second power mode is merely changing the first memory 410-1 from the first power mode to the second power mode.

The different power modes or power states for target devices 406 can include a retention mode, an active mode, a standby mode, an off mode, etc. For illustrative purposes, the first memory device 410-1 will be used to describe the different power modes. In some implementations, in the off mode, no power is provided to the first memory device 410-1 or no power is provided to the memory banks of the first memory device 410-1. This off mode can be useful for conserving power in NVMs. That is, in the off mode, a voltage level of 0V is provided to the first memory device 410-1. In some implementations, in the retention mode, a minimal amount of power is provided to the first memory device 410-1 or the minimal amount of power is provided to the memory banks of the first memory device 410-1. The minimal amount of power is defined as minimal power required to retain or conserve content stored in the first memory device 410-1. Providing power below the minimal amount of power can result in corruption of content stored within one or more of the memory storage locations of the first memory device 410-1. The retention mode is beneficial for volatile memories like SRAM or some volatile cache memory. In some implementations, the minimal amount of power is related to a minimal voltage that prevents corruption of content stored within one or more of the memory storage locations of the first memory device 410-1. Therefore, in the retention mode, a minimal voltage can be provided to the first memory device 410-1 or the minimal voltage can be provided to the memory banks of the first memory device 410-1.

In some implementations, in the active mode, enough power is provided to the first memory device 410-1 or enough power is provided to at least one of the memory banks of the first memory device 410-1 to perform memory operations with performance that meets some specific performance criteria for the first memory device 410-1. The power provided in the active mode is greater than that provided in the retention mode. The specific performance criteria can include a minimum data transfer rate that may be performed at the voltage corresponding to the retention mode. In some implementations, in the active mode, the power provided to the first memory device 410-1 or the power provided to at least one of the memory banks of the first memory device 410-1 is related to a voltage level that meets the active mode's specific performance criteria. The voltage level that meets the specific performance criteria is greater than the minimal voltage of the retention mode.

In some implementations, the standby mode is merely a waiting state. That is to transition from the active mode to the standby mode, the power provided in the active mode is reduced to place the first memory device 410-1 or at least one of the memory banks of the first memory device 410-1 in a waiting state. The power provided in the standby mode is lower than the power provided in the active mode but greater than the power provided in the retention mode. The standby mode can conserve energy by preventing excessive powering up and powering down the first memory device 410-1 or at least one of the memory banks of the first memory device 410-1. In the examples described herein, the active mode can draw the most power, followed by the standby mode, followed by the retention mode, and then followed by the off mode. The amount of power drawn is limited by a power level provided to the first memory device 410-1 or at least one of the memory banks of the first memory device 410-1. In some implementations, the power level is directly proportional to the voltage level, so that a lower voltage level indicates a lower power level when compared to a higher voltage level that indicates a higher power level. In some implementations, the voltage level for the retention mode is 0.9V, the voltage level for the active mode is 1.8V, the voltage level for the standby mode is 1.2V, and the voltage level for the off mode is 0V. These different power modes are merely provided as examples. In some implementations, only two of these power modes are used. In some implementations, three of these power modes are used. In some implementations, five or more of these power modes are used. That is, more power levels can be provided beyond the active mode to push performance of the first memory device 410-1, or more than one power level can be provided between the active mode and the retention mode.

At step 506, adjusting the power mode can include changing from the standby mode to the active mode, the retention mode to the active mode, the off mode to the active mode, etc. In some implementations, when the memory operation included in the memory transaction request is completed, adjusting the power mode can include changing from the active mode to the standby mode, the active mode to the retention mode, the standby mode to the retention mode, the standby mode to the off mode, the active mode to the off mode, etc.

In some implementations, the system 400 includes more than one of the target device 406 so that a second memory device 410-2 is maintained in a previous power mode when the power mode of the first memory device 410-1 is adjusted. In some implementations, other memory banks in the first memory device 410-1, apart from the first memory bank 411a, are maintained in a previous power mode when the power mode of the first memory bank 411a is adjusted. In an example, an SRAM may be in the retention mode, and the power for the SRAM is adjusted to the active mode. In another example, the SRAM may be in the retention mode, and a memory bank within the SRAM is adjusted to the active mode while other memory banks within the SRAM are maintained in the retention mode. In another example, the SRAM and a TCM may both be in the retention mode, and the power for the SRAM is adjusted to the active mode while the power for the TCM is maintained in the retention mode. These combinations are merely provided as examples and other combinations are anticipated with the memories 410-1 to 410-Z and/or peripheral devices 412.

Although the amount of power available to the target devices 406 and the different power modes are discussed in reference to power provided, the power provided to the target devices 406 can be adjusted by selectively changing voltage levels of the target devices 406. The power provided and the voltage level can be positively correlated such that the active mode operates at a higher voltage level than the standby mode which operates at a higher voltage level than the retention mode. Depending on the specific target device, granular control of the voltage levels at the memory bank level can be performed as discussed above, according to certain aspects of the present disclosure.

At step 508, a memory operation is performed on the memory device. Once the first memory 410-1 is placed in the active mode or the first bank 411a is placed in the active mode, the fabric 404 can perform the memory operation included in the memory transaction request, during the active mode. The originating controller 402 can receive, via the fabric 404, stored data from the memory storage locations 413a when the memory transaction request includes a transaction for a read operation. The originating controller 402 can send, via the fabric 404, data to the memory storage locations 413a when the memory transaction request includes a transaction for a program operation or a transaction for a write operation.

In some implementations, the memory operation is performed on the second memory 410-2 or the second bank 411b based on the source address included in the memory transaction request. For example, the source address can point to the second bank 411b or can point to a memory bank within the second memory 410-2. Assuming that the second bank 411b includes memory storage locations 413b that the fabric 404 should perform the memory operation on, the second bank 411b may already be in the active mode. In some implementations, the step 506 to adjust the power state of the first bank 411a can be performed in response to the memory operation being performed on the second bank 411b. That is, accessing address M in the second bank 411b actually powers up address M+1 in a rolling manner. Assuming that the second bank 411b, which includes memory storage locations corresponding to the address M, is already powered up performing the memory operation on the second bank 411b triggers the first bank 411a to be powered up from the standby mode to the active mode. This implementation provides a situation where the memory bank being adjusted from standby mode to active mode does not include memory storage locations addressed by a source address in the memory transaction request.

In some implementations, a counter can be used to generate a time buffer before adjusting the power mode of the first memory 410-1 from the active mode to the standby mode. In some implementations, after completing the memory operation, the power mode of the first memory 410-1 is placed in the standby mode before starting the counter. Once the counter generates a sleep signal, then the first memory 410-1 is adjusted from the standby mode to the retention mode or from the standby mode to the off mode. In some implementations, the counter can have two or more thresholds. A first threshold can be used for generating a first sleep signal to transition from the active mode to the standby mode, and a second threshold can be used for generating a second sleep signal to transition from the standby mode to the retention or off mode. The duration elapsed before transitioning from the active mode to the standby mode can be shorter than the duration elapsed before transition from the standby mode to the retention mode or off mode.

Embodiments of the disclosure are directed to a method of obtaining power efficiency through on-demand activation of memory paths during sleep and active modes of an MCU. In sleep mode, the MCU may have peripheral or memory devices in retention or off modes, and a core of the MCU is off. In the active mode, peripheral or memory devices may be in the retention or off states, depending on the activity of these devices, and the core of the MCU is on. The MCU may perform tasks in either the sleep mode or the active mode, hence on-demand activation of memory paths can ensure providing power to those components necessary for completing the tasks while conserving power for the other components not needed. A power controller is configured to control and customize delivery of power to memory devices. The power controller can deliver power to or control the delivery of power to on-chip memory devices (e.g., system SRAM, TCM, etc.), memory banks of the on-chip memory devices, and/or some external memory devices in a way such that a particular set of memory banks in a memory device are activated based on a transaction request from an agent. Each memory bank within a memory device can be in an active mode, a standby mode, or a retention mode at any time, based on control signals from the power controller that adjust the voltage delivered to that memory bank.

Although the disclosed embodiments have been illustrated and described with respect to one or more implementations, equivalent alterations and modifications will occur or be known to others skilled in the art upon the reading and understanding of this specification and the annexed drawings. In addition, while a particular feature of the invention may have been disclosed with respect to only one of several implementations, such feature may be combined with one or more other features of the other implementations as may be desired and advantageous for any given or particular application.

While various embodiments of the present invention have been described above, it should be understood that they have been presented by way of example only, and not limitation. Numerous changes to the disclosed embodiments can be made in accordance with the disclosure herein, without departing from the spirit or scope of the invention. Thus, the breadth and scope of the present invention should not be limited by any of the above described embodiments. Rather, the scope of the invention should be defined in accordance with the following claims and their equivalents.

What is claimed is:

1. A low-power system-on-chip comprising:
   an originating controller configured to initiate a memory transaction request;
   a fabric communicatively coupled to the originating controller, the fabric including an arbiter configured to receive the memory transaction request and determine a first memory device associated with the memory transaction request, the memory transaction request including a source address; and
   a power controller communicatively coupled to at least one of the originating controller or the fabric, the power controller configured to selectively change a first memory bank of the first memory device from a first power mode to a second power mode based at least in part on the source address;
   wherein the fabric is configured to perform a memory operation by
      (a) receiving stored data from memory storage locations corresponding to the source address when the memory transaction request includes a read request, and
      (b) sending data included in the memory transaction request to the memory storage locations when the memory transaction request includes a program request or a write request.

2. The low-power system-on-chip of claim 1, wherein the first power mode is one of a retention mode or a standby mode and the second power mode is an active mode.

3. The low-power system-on-chip of claim 1, wherein the power controller is further configured to selectively change the first memory bank of the first memory device from the second power mode to the first power mode.

4. The low-power system-on-chip of claim 3, wherein the power controller selectively changes the first memory bank of the first memory device from the second power mode to the first power mode in response to a sleep signal generated by a counter, the originating controller, and/or the arbiter.

5. The low-power system-on-chip of claim 1, wherein the power controller is further configured to selectively change the first memory bank of the first memory device from the second power mode to a third power mode, the second power mode having a higher power draw than the third power mode, and the third mode having a higher power draw than the first power mode.

6. The low-power system-on-chip of claim 1, wherein the first memory device includes a plurality of memory banks including the first memory bank and a second memory bank, and wherein the power controller is configured to maintain other memory banks, including the second memory bank, in the first power mode when selectively changing the first memory bank from the first power mode to the second power mode.

7. The low-power system-on-chip of claim 1, further comprising:
   a second memory device, wherein the power controller is configured to maintain the second memory device in the first power mode when selectively changing the first memory bank from the first power mode to the second power mode.

8. The low-power system-on-chip of claim 1, wherein the power controller is configured to selectively change the first memory bank from the first power mode to the second power mode by changing power supplied to the first memory bank from a first voltage level to a second voltage level, the second voltage level being greater than the first voltage level.

9. The low-power system-on-chip of claim 8, wherein the power controller is further configured to change the power supplied to the first memory bank from the second voltage level to the first voltage level after the fabric performs the memory operation.

10. The low-power system-on-chip of claim 1, wherein the first memory device includes a plurality of memory banks including the first memory bank, and wherein the power controller is further configured to selectively change each memory bank in the plurality of memory banks, from the first power mode to the second power mode.

11. The low-power system-on-chip of claim 1, wherein the fabric further includes one or more of multiplexers, buffers, switches, and crossbars.

12. The low-power system-on-chip of claim 1, wherein the fabric is a network-on-chip (NoC) having at least a first logic domain and a second logic domain, wherein the first logic domain can switch between an active mode and a standby mode, and the second logic domain can switch between an on state and an off state.

13. The low-power system-on-chip of claim 1, wherein the arbiter is a programmable logic.

14. The low-power system-on-chip of claim 1, wherein the originating controller includes one or more of a microcontroller unit, a central processing unit, a graphics processing unit, a neural processing unit, a direct memory access controller, a serial communications controller, and an analog-to-digital converter.

15. The low-power system-on-chip of claim 14, wherein the serial communications controller includes a universal serial bus (USB) controller, inter-integrated circuit (I2C) controller, and/or serial peripheral interface (SPI) controller.

16. The low-power system-on-chip of claim 1, wherein the first memory device is a random access memory (RAM), a tightly-coupled memory (TCM), nonvolatile memory (NVM), a cache, an external memory, a register, a register file, a peripheral device.

17. The low-power system-on-chip of claim 1, wherein the first memory bank includes memory storage locations corresponding to the source address such that the fabric performs the memory operation on the first memory bank.

18. The low-power system-on-chip of claim 1, wherein the first memory device includes a plurality of memory banks including the first memory bank and a second memory bank, wherein the second memory bank is configured in the second power mode and the second memory bank includes the memory storage locations corresponding to the source address such that the fabric performs the memory operation on the second memory bank, and wherein the power controller selectively changes the first memory bank from the first power mode to the second power mode in response to the fabric performing the memory operation on the second memory bank.

19. A method for operating a memory device in a low-power system-on-chip, the method comprising:
  receiving, by an arbiter, a memory transaction request generated by an originating controller, the memory transaction request including a source address;
  determining, by the arbiter, a first memory device associated with the memory transaction request;
  requesting, by the arbiter, that a power controller selectively change a first memory bank of the first memory device from a first power mode to a second power mode based at least in part on the source address;
  performing, by a fabric, a memory operation by
    (a) receiving stored data from the memory storage locations corresponding to the source address when the memory transaction request includes a read request, and
    (b) sending data included in the memory transaction request to the memory storage locations when the memory transaction request includes a program request or a write request.

20. The method of claim 19, wherein the first power mode is one of a retention mode or a standby mode and the second power mode is an active mode.

21. The method of claim 19, further comprising:
  requesting, by the arbiter, that the power controller selectively change the first memory bank of the first memory device from the second power mode to the first power mode.

22. The method of claim 19, wherein the originating controller includes one or more of a microcontroller unit, a central processing unit, a graphics processing unit, a direct memory access controller, an analog-to-digital converter, and a serial communications controller.

23. The method of claim 19, wherein the first memory bank includes memory storage locations corresponding to the source address.

24. The method of claim 19, wherein the first memory device includes a plurality of memory banks including the first memory bank and a second memory bank, wherein the second memory bank is in the second power mode and the second memory bank includes the memory storage locations corresponding to the source address such that the fabric performing the memory operation on the second memory bank triggers the power controller selectively changing the first memory bank from the first power mode to the second power mode.

* * * * *